(12) United States Patent
Bailey et al.

(10) Patent No.: US 8,770,304 B2
(45) Date of Patent: *Jul. 8, 2014

(54) OPEN-HOLE WELLBORE LINING

(75) Inventors: Louise Bailey, Yelling (GB); John Cook, Cambridge (GB); Armelle Payen, Jeniain (FR); Sylvie Daniel, Missouri City, TX (US); Mickael Allouche, Paris (FR)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/051,966

(22) Filed: Mar. 18, 2011

(65) Prior Publication Data

US 2011/0183873 A1    Jul. 28, 2011

Related U.S. Application Data

(63) Continuation of application No. 11/866,791, filed on Oct. 3, 2007, now Pat. No. 7,931,091.

(51) Int. Cl.
*E21B 23/00* (2006.01)
*C09K 8/12* (2006.01)

(52) U.S. Cl.
USPC ............ 166/381; 118/620; 507/119; 507/117

(58) Field of Classification Search
CPC .................................................. E21B 33/138
USPC ........... 166/294, 247; 118/620; 250/253, 254, 250/258, 372
See application file for complete search history.

(56) References Cited

U.S. PATENT DOCUMENTS

| | | | |
|---|---|---|---|
| 3,114,419 A | * | 12/1963 | Perry et al. ............... 166/247 |
| 3,872,923 A | | 3/1975 | Knight et al. |
| 3,877,522 A | | 4/1975 | Knight et al. |
| 4,547,298 A | * | 10/1985 | Novak ........................ 507/118 |
| 4,744,631 A | | 5/1988 | Eichenbaum et al. |
| 4,760,882 A | | 8/1988 | Novak |
| 4,768,593 A | | 9/1988 | Novak |
| 4,933,815 A | | 6/1990 | Parthasarathy |
| 5,019,417 A | | 5/1991 | Northcutt |
| 5,494,106 A | | 2/1996 | Gueguen et al. |
| 5,617,496 A | | 4/1997 | Kingstone |

(Continued)

FOREIGN PATENT DOCUMENTS

| | | |
|---|---|---|
| EP | 1001211 A1 | 5/2000 |
| EP | 1001290 A1 | 5/2000 |

(Continued)

OTHER PUBLICATIONS

Davidson, Radiation Curing, Rapra Technology Ltd., 2001, pp. 3-30, report 136, vol. 12, No. 4, 2001, United Kingdom.

(Continued)

*Primary Examiner* — James Sayre

(57) ABSTRACT

Embodiments of the present invention provide compositions and methods for lining a wellbore. In certain aspects, the compositions and methods comprise providing a fluid composition that is solidifiable or gellable on exposure to actinic radiation of a predetermined wavelength at the wall of open-hole wellbore and providing actinic radiation at the predetermined wavelength to solidify or gel the composition. The predetermined wavelength lies in a range from 100 nm to 1500 nm.

20 Claims, 6 Drawing Sheets

(56) References Cited

U.S. PATENT DOCUMENTS

| | | | |
|---|---|---|---|
| 5,679,719 A * | 10/1997 | Klemarczyk et al. | 522/13 |
| 5,695,008 A | 12/1997 | Bertet et al. | |
| 5,718,288 A | 2/1998 | Bertet et al. | |
| 5,804,301 A | 9/1998 | Curatolo | |
| 5,995,702 A | 11/1999 | Tjonneland | |
| 6,044,906 A | 4/2000 | Saltel | |
| 6,199,223 B1 | 3/2001 | Sorokin | |
| 6,638,063 B2 | 10/2003 | Otsuka | |
| 6,969,427 B1 | 11/2005 | Noles, Jr. | |
| 7,013,995 B2 | 3/2006 | Crawshaw et al. | |
| 7,090,370 B2 | 8/2006 | Clark et al. | |
| 7,100,684 B2 | 9/2006 | Cook et al. | |
| 7,151,123 B2 | 12/2006 | Ramsey | |
| 7,183,333 B2 | 2/2007 | Bradley | |
| 7,231,977 B2 | 6/2007 | Keller | |
| 7,334,637 B2 | 2/2008 | Smith, Jr. | |
| 7,455,106 B2 | 11/2008 | Veneruso et al. | |
| 7,516,802 B2 | 4/2009 | Smith, Jr. | |
| 7,931,091 B2 * | 4/2011 | Bailey et al. | 166/381 |
| 2003/0196808 A1 * | 10/2003 | Blauch et al. | 166/300 |
| 2004/0014833 A1 | 1/2004 | Bradley | |
| 2004/0062023 A1 | 4/2004 | Elsegood | |
| 2005/0171227 A1 | 8/2005 | Weine | |
| 2006/0185843 A1 | 8/2006 | Smith | |
| 2007/0051510 A1 | 3/2007 | Veneruso et al. | |
| 2007/0102156 A1 | 5/2007 | Nguyen et al. | |
| 2009/0090514 A1 | 4/2009 | Bailey et al. | |
| 2010/0247794 A1 | 9/2010 | Bailey et al. | |
| 2011/0162854 A1 | 7/2011 | Bailey et al. | |

FOREIGN PATENT DOCUMENTS

| | | | |
|---|---|---|---|
| FR | 2780751 A1 | | 1/2000 |
| GB | 2363810 A | | 1/2002 |
| GB | 2363810 B | | 3/2003 |
| GB | 2420572 A | | 5/2006 |
| WO | 9706346 A1 | | 2/1997 |
| WO | 98/59151 A1 | | 12/1998 |
| WO | 01/98627 A1 | | 12/2001 |
| WO | WO 2006050811 A1 * | | 5/2006 |

OTHER PUBLICATIONS

Fouassier, Photoinitiated Polymerisation—Theory and Applications, Rapra Technology Ltd., 1998, pp. 3-23, report 100, vol. 9, No. 4, United Kingdom.

LeCamp et al., Photoinitiated Polymerization of a Dimethacrylate Oligomer: 2. Kinetic studies, Polymer, 1999, pp. 1403-1409, vol. 40.

Final Office Action issued in Related U.S. Appl. No. 11/866,791 dated May 18, 2010; 7 pages.

Non-Final Office Action issued in Related U.S. Appl. No. 11/866,791 dated Oct. 28, 2009; 7 pages.

Non-Final Office Action issued in Related U.S. Appl. No. 11/866,791 dated Jul. 9, 2010; 8 pages.

Notice of Allowance issued in Related U.S. Appl. No. 11/866,791 dated Dec. 23, 2010; 4 pages.

Final Office Action issued in Related U.S. Appl. No. 12/415,297 dated Nov. 9, 2011; 12 pages.

Final Office Action issued in Related U.S. Appl. No. 12/415,297 dated Sep. 10, 2012; 6 pages.

Non-Final Office Action issued in Related U.S. Appl. No. 12/415,297 dated Jan. 27, 2012; 13 pages.

Non-Final Office Action issued in Related U.S. Appl. No. 12/415,297 dated Jul. 20, 2011; 13 pages.

Notice of Allowance issued in Related U.S. Appl. No. 12/415,297 dated Nov. 9, 2012; 9 pages.

Non-Final Office Action issued in Related U.S. Appl. No. 13/052,539 dated Sep. 30 2011; 9 pages.

Notice of Allowance issued in Related U.S. Appl. No. 13/052,539 dated Mar. 23, 2012; 5 pages.

Basle, "Coating Effects Segment Brochure Edition 4.9.2001: Ciba DAROCUR 1173", Ciba Specialty Chemicals, 2001, pp. 1-3.

Eurasian Patent Organization Office Action issued in EA 201070425 on Feb. 6, 2012; 2 pages.

Eurasian Patent Organization Office Action issued in EA 201070425 on Jun. 13, 2012; 3 pages.

Eurasian Patent Organization Office Action issued in EA 201070425 on Sep. 1, 2011; 4 pages.

Hsi, et al., "SPE 65014: Field Evaluation of Downhole Corrosion Mitigation Methods at Prudhoe Bay Field, Alaska", SPE International, 2001, pp. 1-6.

Jabs, et al., "IADC/SPE 87212: New Expandable Cladding Technique Enables Extended Length Casing Repair", SPE International, 2004, pp. 1-4.

Leighton, et al., "Water Shutoff Using an Inflatable Composite Sleeve Polymerized In-Situ: A Case History on Forties Delta", SPE Production & Facilities, May 2001, pp. 97-105.

Mittal, "Adhesion Measurement of Thin Films", Electrocomponent Science and Technology, 1976, vol. 3, pp. 21-42.

Morrison, "SPE 30984: Down Hole Corrosion: Problems & Possible Solutions", SPE International, 1995, pp. 89-95.

International Search Report & Written Opinion issued in PCT/GB2008/003334 on Feb. 9, 2009; 9 pages.

International Search Report & Written Opinion issued in PCT/IB2010/000346 on Oct. 13, 2010; 7 pages.

Saltel, et al., "In-Situ Polymerization of an Inflatable Composite Sleeve to Reline Damaged Tubing and Shut Off Perforations", SPE Drill & Completion, vol. 14(2), Jun. 1999, pp. 115-122.

Storaune, et al., "SPE/IADC 92330: Versatile Expandables Technology for Casing Repair", SPE International, 2005, pp. 1-8.

Styler, et al., "SPE 68129: A Unique Rigless Casing Leak Repair, Ghawar Field, Saudi Arabia", SPE International, 2001, pp. 1-6.

Ven de Velden, et al., "SPE 108757: Solid Expandables Repair Prolific Subsea Gas Producer", SPE International, 2007, pp. 1-8.

* cited by examiner

YIELD STRESS OF DIFFERENT GELS

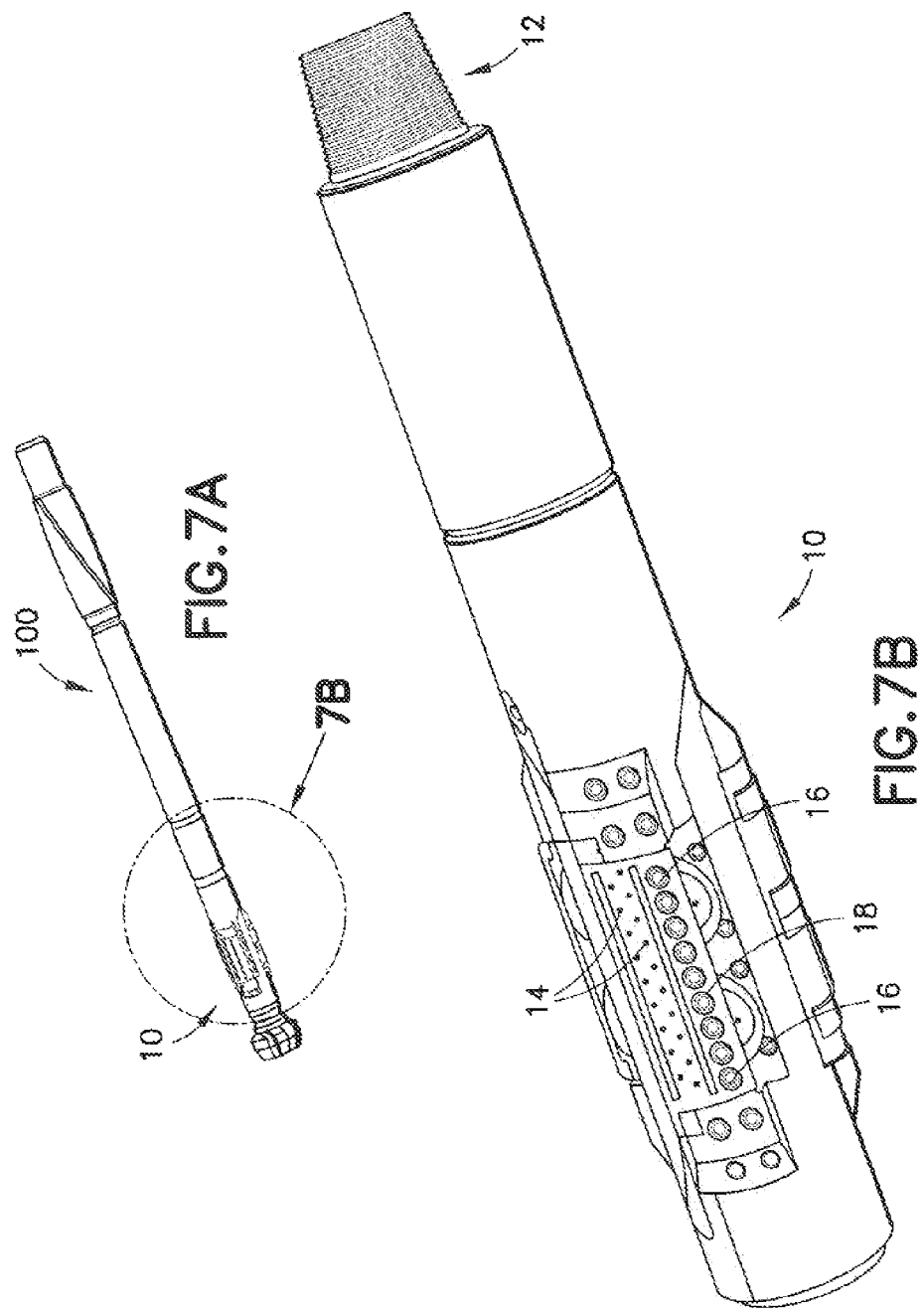

OPEN-HOLE WELLBORE LINING

CROSS REFERENCE TO RELATED APPLICATIONS

The present application is a continuation application from U.S. patent application Ser. No. 11/866,791 filed 3 Oct. 2007 which is incorporated by reference herein in its entirety.

FIELD OF THE INVENTION

This invention relates to compositions and methods for lining wellbores and to a tool for producing downhole coatings for a wellbore.

BACKGROUND TO THE INVENTION

As a general method of forming a wellbore, e.g. for extraction of oil or gas from a formation, a drilling operation typically involves mounting a drill bit on a drilling assembly (the "bottom hole assembly") at the lower end of a drill string and rotating the drill bit against the bottom of a hole to penetrate the formation, thereby creating a wellbore.

A drilling fluid, such as a "drilling mud", typically circulates down through the drill string, passes via the drill bit, and returns back to the surface, usually in the annular portion between the drill string and the wall of the wellbore. The drilling fluid serves a number of purposes, including lubricating the drill bit and cooling the drilling assembly. However, the drilling fluid can also be suitably pressurized to provide sufficient hydrostatic pressure at the wellbore wall to prevent the flow of fluids into the wellbore from the surrounding formation.

Such relatively high pressure can produce undesirable mechanical forces on the formation, which may lead to wellbore damage. In particular, as the wellbore deepens the hydrostatic pressure at the lower end of the wellbore can be significantly higher than the pressure near the entrance aperture of the wellbore.

Accordingly, in the past, it has been necessary periodically to halt the drilling operation and to provide a casing within the wellbore to provide structural support, the casing typically being cemented in place to the wall of the wellbore. U.S. Pat. Nos. 4,760,882, 4,547,298 and 4,768,593 describe such a process in more detail.

In particular, in the method disclosed in these patents a cement mixture is located in the annular region between the casing and the wall of the wellbore and is set (solidified) in situ by exposure to gamma-radiation produced by e.g. a Co-60 source lowered down the encased wellbore on a probe.

However, to be able to drill a deep wellbore or a wellbore in a relatively unstable formation (e.g. a shale or clay formation), the drilling operation must be halted repeatedly to allow the wellbore to be so encased. This has disadvantages in that it delays the extraction of valuable oil and/or gas from the well and consequently has a negative economic impact.

GB Patent No. 2 363 810 recognizes this disadvantage and discloses a method of lining a wellbore during the drilling operation. The method allows a material to form a layer supported by a wall of the wellbore, where the material is selected so that the shear modulus of the layer is smaller than the shear modulus of the formation forming the wall of the wellbore. When the wellbore is sufficiently deep, a casing can be cemented in place in the wellbore in the usual way.

GB Patent No. 2420572 discloses a process of forming a layer on the wall of a wellbore when drilling through a shale and/or clay formation. The interaction of water with a shale and/or clay wellbore wall can cause the shale and/or clay to swell, thereby contracting the wellbore and possibly leading to softening and disintegration of the wall of the wellbore. The lining disclosed in GB Patent No. 2420572 is intended to prevent absorption of water into the shale and/or clay, rather than to provide the wellbore wall with mechanical support.

The process of GB2420572 includes the steps of bringing a drilling fluid which includes a graft polymer into contact with the clay or shale wall of the wellbore and letting the graft polymer form a layer on the wall. The graft polymer is a copolymer, formed by the reaction of an oligomeric or polymeric substrate with at least one ethylenically unsaturated monomer. The reaction to form the graft polymer, e.g. performed in a reaction chamber, is conducted in the presence of a type II photo initiator and by the action of actinic radiation. The resulting graft polymer being suitable for adding to a drilling mud for use as described above.

However, the use of such a process has its disadvantages. The extent of mechanical support offered by a layer of graft polymer is likely to be small. The graft polymer is relatively indiscriminate, and it is therefore likely to be difficult to control accurately the thickness or location of the layer which it forms on the wall of the wellbore.

SUMMARY OF THE INVENTION

Embodiments of the present invention provide a controllable process for lining a wellbore or coating downhole components of a wellbore, wherein a chemical reaction can be initiated downhole, by actinic radiation, to create a solid or gel, from a suitable fluid composition, for coating a surface.

In a first aspect, the present invention provides a process for lining a wellbore comprising: providing a fluid composition in an open-hole (i.e. uncased) wellbore, the fluid composition being solidifiable or gellable on exposure to actinic radiation of a predetermined wavelength; and providing actinic radiation of said predetermined wavelength at the wall of the wellbore, whereby the composition solidifies or gels to line said wall.

By providing the actinic radiation for solidifying or gelling the fluid composition in situ in the wellbore proximate to the region in which the solidified or gelled fluid composition is desired, more control over the lining of the wellbore is achievable. Thus, in accordance with an embodiment of the present invention, specific regions of a wellbore, e.g. cracked or fissured regions, can be lined or re-lined. Advantageously, the present invention also allows a wellbore, such as an open-hole wellbore, to be lined without the need to halt the drilling, or with the need to complete the drilling before lining the wellbore.

The predetermined wavelength of the actinic radiation may be in the range 1 nm to 1500 nm, 10 nm to 1500 nm, 100 nm to 1200 nm, or 200 nm to 1200 nm. On certain aspects, the actinic radiation is in the range of from 250 nm to 800 nm. Sources of actinic radiation in this wavelength range are readily available and are safe to use, and they do not carry the inherent risks associated with the use of ionizing radiation such as gamma-radiation etc.

In another aspect, the present invention provides a process for producing coatings on downhole components of a wellbore, the process comprising: providing a fluid composition at a surface of a downhole component of a wellbore, the fluid composition being solidifiable or gellable on exposure to actinic radiation of a wavelength in the range of from 250 nm to 800 nm; and providing actinic radiation of said wavelength at said surface, whereby the composition solidifies or gels to coat said surface.

The following preferred features are applicable to all aspects of the present invention.

The fluid composition may contain a pre-polymer and photoinitiator, the pre-polymer and photoinitiator taking part in a downhole reaction to form the solidified or gelled composition when irradiated with a sufficient dose of the actinic radiation. The solidified or gelled composition is preferably impermeable to wellbore and/or reservoir fluids.

The fluid composition may be formed downhole in the wellbore. Indeed, the fluid composition may be formed downhole and proximate to a predetermined region of the wall to be lined or to the surface to be coated.

One or more of the components of the fluid composition may be injected into the wellbore at the surface. If a drilling mud is injected to the wellbore at the surface, then the components of the fluid composition may be carried, e.g. downhole, by the drilling mud.

In another aspect, the present invention provides a tool for producing downhole coatings, the tool being configured to operate downhole, and comprising a source of actinic radiation of a wavelength in the range of from 250 nm to 800 nm.

The tool may further comprise a reservoir for holding one or more components of a fluid composition which is solidifiable or gellable on exposure to actinic radiation of such a wavelength, the reservoir being configured such that the components are controllably releasable from the reservoir to be delivered to a surface to be coated, e.g. for lining a wall of the wellbore.

In another aspect, the present invention provides a tool for producing downhole coatings, the tool being configured to operate downhole, wherein the tool comprises a source of actinic radiation of a predetermined wavelength, and a reservoir for holding one or more components of a fluid composition which is solidifiable or gellable on exposure to actinic radiation of said predetermined wavelength, the reservoir being configured such that the components are controllably releasable from the reservoir to be delivered to a surface to be coated, e.g. for lining a wall of the wellbore.

A tool according to the present invention may be attachable to a wireline and be operable when so attached. A tool according to the present invention may be attachable to a drill string or a coiled tubing, and may be operable when so attached. Therefore, the lining of the wellbore can take place during the drilling process. Indeed, a tool according to the present invention may be an element of a bottom hole assembly. The bottom hole assembly may carry the source of actinic radiation.

A tool according to the present invention could be an element of a drill string stabiliser. Advantageously, drill string stabilisers are generally in contact with a portion of the wellbore wall, and so a tool according to the present invention which is an element of such a stabiliser should also be located close to the wellbore wall, thereby allowing the wellbore to be lined progressively as the drill string is lowered downhole.

A tool according to the present invention may comprise one or more movable members which are deployable to irradiate the surface to be coated, e.g. the wall of the wellbore, with actinic radiation produced by said source. The movable members may carry the source of actinic radiation. The movable members may carry the light-emitting ends of one or more lights guides which extend from the source of actinic radiation.

The source of actinic radiation may include one or more light emitting diodes, one or more laser diodes, and/or one or more organic light emitting diodes, such as a polymer light emitting diode.

Further aspects and embodiments of the present invention will be apparent to those skilled in the art. For the avoidance of doubt, it is stated here that all documents mentioned in this text are incorporated herein by reference.

BRIEF DESCRIPTION OF THE DRAWINGS

Aspects and embodiments of the present invention will now be illustrated, by way of example, with reference to the accompanying figures, in which:

FIG. 7 shows a tool according to the present invention.

DETAILED DESCRIPTION OF THE INVENTION

Figure 1:
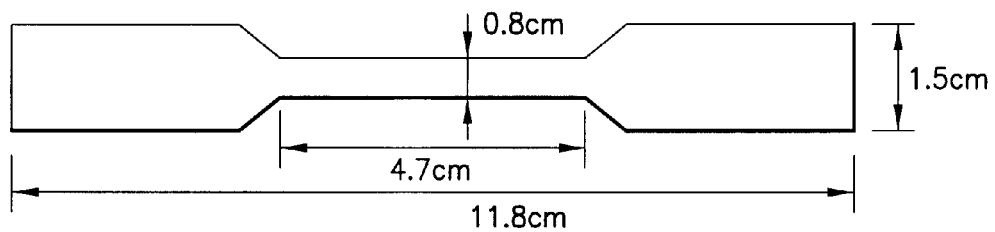
FIG. 1 shows the shape of a mould used to produce solidified or gelled compositions for subsequent tensile testing.

Radiation curing is the technique of using electromagnetic (EM) or actinic radiation to cause physical changes in materials. The curing process can involve one or more of polymerisation, cross-linking, grafting, and, in certain cases, depolymerisation.

Frequently used sources of EM radiation for curing include electron beam (EB), ultraviolet light (UV) and gamma radiation. However, the field has recently expanded to include the use of deep UV (<200 nm), visible light, near infra-red radiation, and microwaves.

The EM radiation can be used to generate radicals, carbocations and bases, to initiate cycloaddition reactions, and in the case of microwave radiation, to bring about thermal reactions.

In the present invention, actinic radiation, preferably EM actinic radiation is used to gel or solidify a fluid composition which is solidifiable or gellable on exposure to the actinic radiation.

Examples of typically water-soluble chemicals which exhibit photo-initiated polymerization and are therefore suitable for implementing the present invention are acrylate and methacrylate monomers, such as:

Bis phenol A ethoxylate diacrylate;
Ethylene glycol diacrylate (varying molecular weight);
Hexanediol diacrylate; and
Trimethyolpropane triacrylate.

Examples of water-soluble and oil-soluble chemicals which exhibit photo-initiated polymerization and are therefore suitable for implementing the present invention are vinyl ethers, such as:

Vectomers™: vinyloxybutyl benzoate and bis and tris variants;
Urethane divinyl ethers; and
Ethylene glycol divinyl ethers (varying molecular weight).

Merely by way of example, other examples of suitable chemicals are vinyl functionalized polymers and oligomers such as polybutadienes or polyisoprenes, block copolymers such as styrene-butadiene, styrene-butadiene-styrene and styrene-isoprene-styrene such as those manufactured by Kraton Polymer LLC. They are primarily solvated in nonaqueous base fluids and would be especially useful for use with oil based muds.

Thus, the prepolymer may be optionally substituted alkenyl, preferably optionally substituted $C_{2-5}$ alkenyl, most preferably optionally substituted $C_{2-3}$ alkenyl. The alkenyl may be substituted with one or more groups independently selected from $C_{1-10}$ alkyl, $C_{1-10}$ aryl and $C_{3-20}$ heterocyclyl, $C_{1-10}$ alkoxy, halo, hydroxyl and ester. Each of the substituents may be independently further substituted where appropriate. The alkenyl may be substituted with one or more groups independently selected from —R, —OR and —C(=O)OR, where R is halo or hydroxyl, or an optionally substituted group selected from: $C_{1-10}$ alkyl, $C_{1-10}$ aryl and $C_{3-20}$ heterocyclyl. The further substituents may be selected from $C_{1-10}$ alkyl, $C_{1-10}$ aryl and $C_{3-20}$ heterocyclyl, $C_{1-10}$ alkoxy, hydroxyl, halo and ester.

The optionally substituted $C_{2-5}$ alkenyl may be optionally substituted $C_{2-5}$ alk-1-enyl (also known as $C_{2-5}$ 1-alkenyl). Preferably, the $C_{2-5}$ alk-1-enyl includes a vinyl functionality.

The prepolymer may contain one or more polyalkoxy (or polyether) moieties. Preferably, a polyalkoxy moiety is a polyethylene glycol.

Preferably, the molecular weight of a prepolymer is at most 700, at most 600, or at most 350.

A prepolymer may be selected from an acrylate prepolymer, a divinyl ether prepolymer, an alkenyl prepolymer, a styrene prepolymer and a vinyloxy)alkyl prepolymer.

In a preferred embodiment, an alkenyl substituent, including a substituent of an alkenyl substituent, comprises one or more alkenyl groups. The compound may be referred to as a bisalkenyl prepolymer where two alkenyl groups are present in the prepolymer, or a trisalkenyl prepolymer where three alkenyl groups are present in the prepolymer.

The prepolymer may be symmetrical.

In another embodiment the prepolymer is optionally substituted epoxidyl (oxirane). Preferably, the optionally substituted epoxidyl is optionally substituted glycidyl ether. Preferably, the glycidyl ether is substituted with optionally substituted $C_{1-10}$ alkyl, $C_{1-10}$ aryl or $C_{3-20}$ heterocyclyl. The optional substituents may be selected from hydroxyl, alkoxy and heterocyclyl, aryl.

Preferably the composition comprises two or more prepolymers. Each prepolymer may be independently selected from the vinyl prepolymers and the epoxidyl prepolymers described above. The preferred compositions include at least one vinyl prepolymer. The preferred compositions include one or two prepolymers.

Each prepolymer may be independently selected from the group of prepolymers listed above.

Where the polymer is made from two or more prepolymers, the polymer may be an alternating, block or random polymer.

The polymer may be linear or branched.

The composition may include a photoinitiator. The photoinitiator is a compound that is capable of converting absorbed light, visible or UV light preferably light in the range about 250 to about 800 nm, into chemical energy in the form of a reactive initiating species. The initiating species may be a cation or a free radical. The photoinitiator may therefore be referred to as a cation photoinitiator or a free radical photoinitiator respectively.

The radical photoinitiator may be a type I (cleavage type) or a type II (H-abstraction and electron donor) initiator. The type I initiator undergoes a unimolecular bond cleavage (α-cleavage) upon irradiation to yield the free radical. The type II initiator undergoes a bimolecular reaction where the triplet excited state of the photoinitiator interacts with either a second molecule, which may be another initiator molecule, to generate a free radical. Typically, the second molecule is a hydrogen donor. Where the second molecule is not another initiator molecule, it may be referred to as coinitiator. The coinitiator may be an amine, alcohol or ether. Preferably, the coinitiator is an amine, most preferably a tertiary amine. Where the second molecule is another initiator molecule, the initiator may contain amine, alcohol or ether functionality.

Preferably, the cation initiator is a photoacid generator.

Suitable photoinitiators for use in implementing the present invention include (a) Free radical type and (b) Cationic photo-initiation type.

Free radical type. For Type I cleavable photo-initators, benzoin ethers, dialkoxy acetophenones, phosphine oxide derivatives, amino ketones, e.g. 2-dimethyl, 2-hydroxyacetophenone, bis(2,4,6-trimethyl benzoyl)phenyl phosphine oxide, can be used.

If Type II hydrogen abstraction or electron transfer (photoinitiator and synergist) are preferred, then typically aromatic ketones e.g. camphorquinone, thioxanthone, anthraquinone, 1-phenyl 1,2 propanedione, combined with H donors such as alcohols, or electron donors such as amines, can be used.

(b) Cationic photo-initiation type. Photoacid generators typically Diazonium or Onium salts e.g. diaryliodonium or triarylsulphonium hexafluorophosphate, can be used.

A laboratory experiment has been setup to demonstrate the effectiveness of the present invention, the experiment employed a standard 6 W UV lamp and viewing/curing chamber manufactured by UVproducts, and purchased from Fisher Scientic UK. The lamp was dual wavelength, emitting UVA (254 nm) or UVC (365 nm).

The liquid resin was placed in an I-shaped plastic mould 1 in the curing chamber and exposed to UV radiation for several minutes. Typical curing times ranged between 2-10 minutes. The shape of the mould 1 is shown in FIG. 1.

The cast resin samples, approximately 1 mm thick, were tested for tensile strength using the TXAT texture analyzer (Stable Microsystems Inc.) in extension mode. Coarse abrasive paper was glued to the face of the sample grips to prevent slippage of the smooth resins.

Curing kinetics were followed using a Nicolet FTIR (Fourier Transform Infra-Red) spectrometer with a ZnSe ATR (attenuated total reflection) plate. The UV lamp was placed in the access port on the spectrometer, and the plate was irradiated during spectral acquisition.

The evolution of the height of the 1634 or 1610 $cm^{-1}$ peaks were followed, these being the C=C stretch of the acrylate and vinyl ether groups respectively. As the polymerization reaction proceeded the C=C bonds were eliminated and the peak height dropped.

EXAMPLE 1

Acrylate Type Resins

In this example the liquid composition includes components A, B, C and D:
A) bisphenol A ethoxylate diacrylate (BAED)
B) trimethylolpropane triacrylate (TPT)
C)
  i. poly(ethylene glycol) diacrylate (PEGD) molecular weight 260;
  ii. poly(ethylene glycol) diacrylate (PEGD) mwt. 700;
  iii. poly(ethylene glycol) diacrylate (PEGD) mwt. 575;
  iv. 1,6-hexanedioldiacrylate (HDD);
  v. poly(ethylene glycol) dimethacrylate m wt. 330 (PEGDM)

D) may be a photoinitiator ~10 drops 2-hydroxy-2-methyl-propiophenone.

TABLE 1

Acrylate based resins compositions

| Formulation | Component A (15 g) | Product B (0.5 g) | Component C (5 g) |
|---|---|---|---|
| Aa | BAED | TPT | PEGD 260 |
| Ab | BAED | TPT | HDD |
| Ac | BAED | TPT | PEGD 700 |
| Ad | BAED | TPT | PEGDM 330 |
| Ae | BAED | TPT | PEGD 575 |
| Ba | BAED | TPTM | PEGD 260 |

Figure 2:
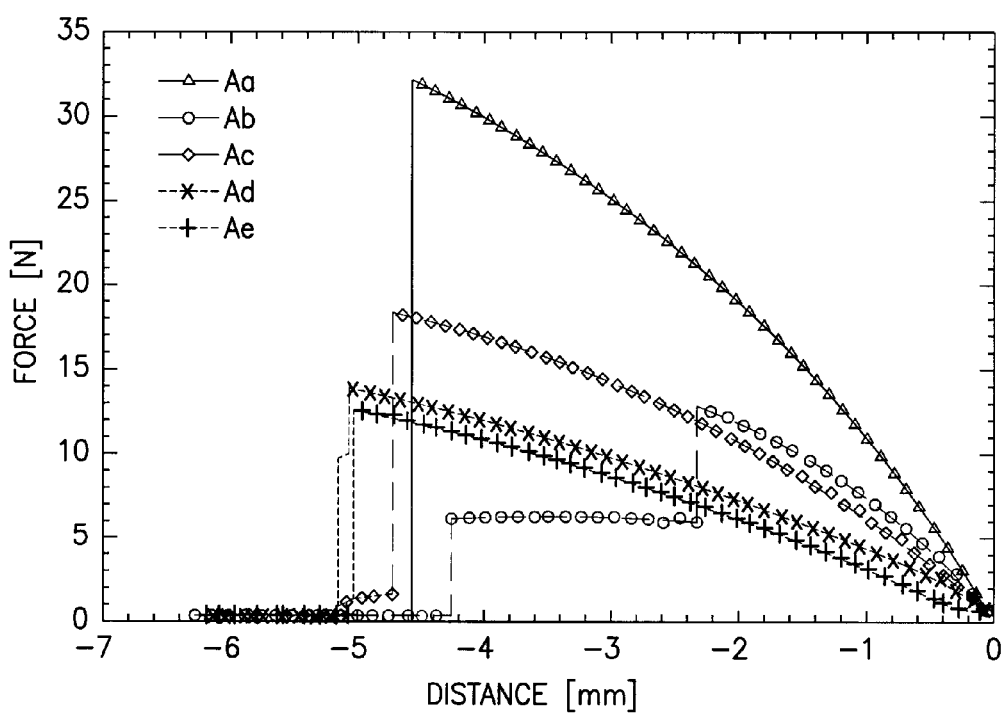
FIG. 2 shows the results of tensile tests on acrylate resins, series A, for the compositions in Table 1.

These compositions produced hard, strong, quite brittle resins. FIG. 2 depicts tensile test data for Series Aa:Ae.

If desired, the resins can be reinforced with fillers such as clay, two examples were used: clay 1, Bentone 42, an organophilic clay from Elementis Specialities Inc.; and clay 2, Bentopharm, a natural montmorillonite from Wilfred Smith Ltd. The clays were added at 1%, 5%, 10% or 20% to the base resins and rolled overnight to ensure dispersion.

Figure 3:
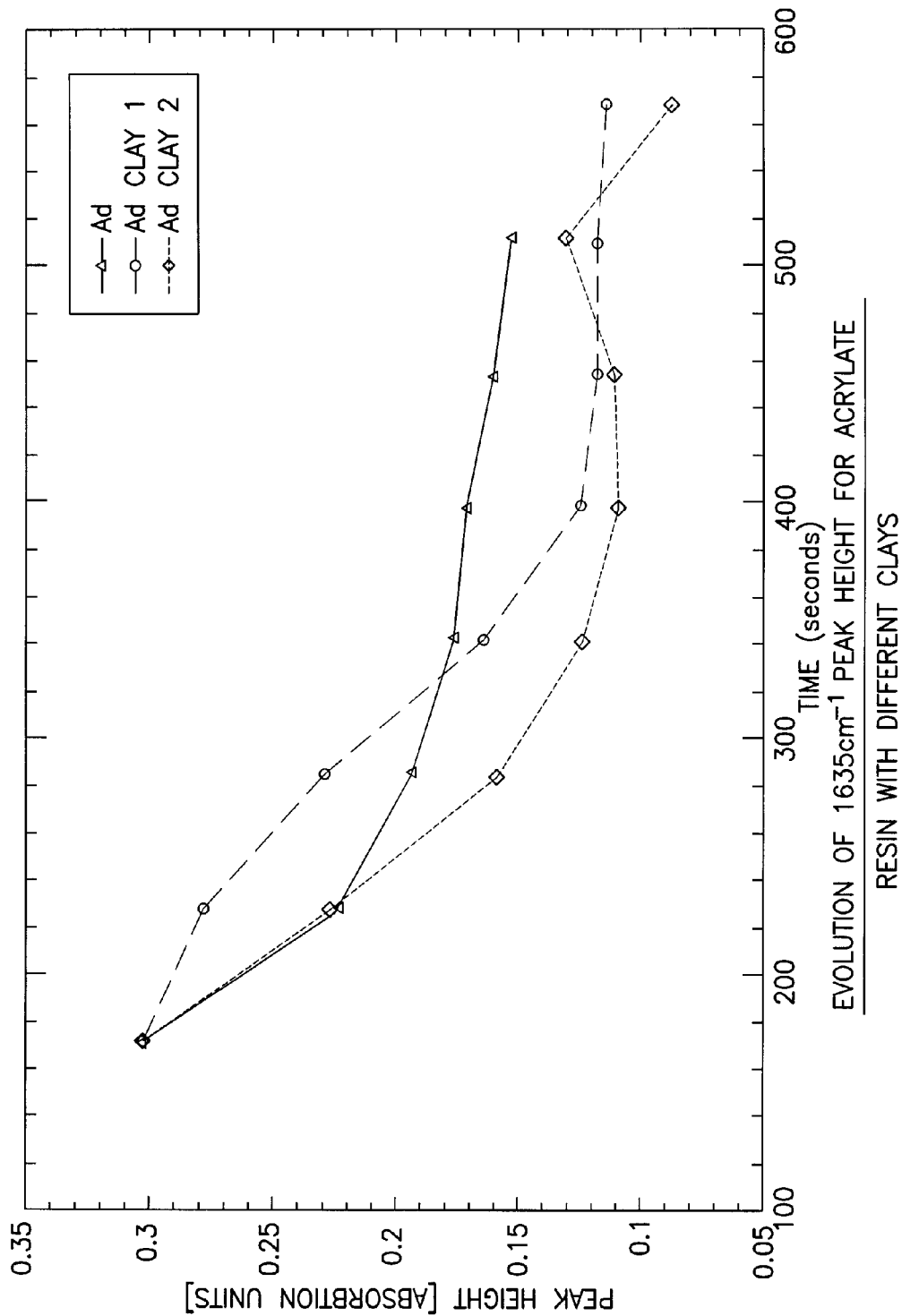
FIG. 3 shows the curing Kinetics for acrylate resin Ad mixed with clay, for the composition in Table 1.
Figure 4:
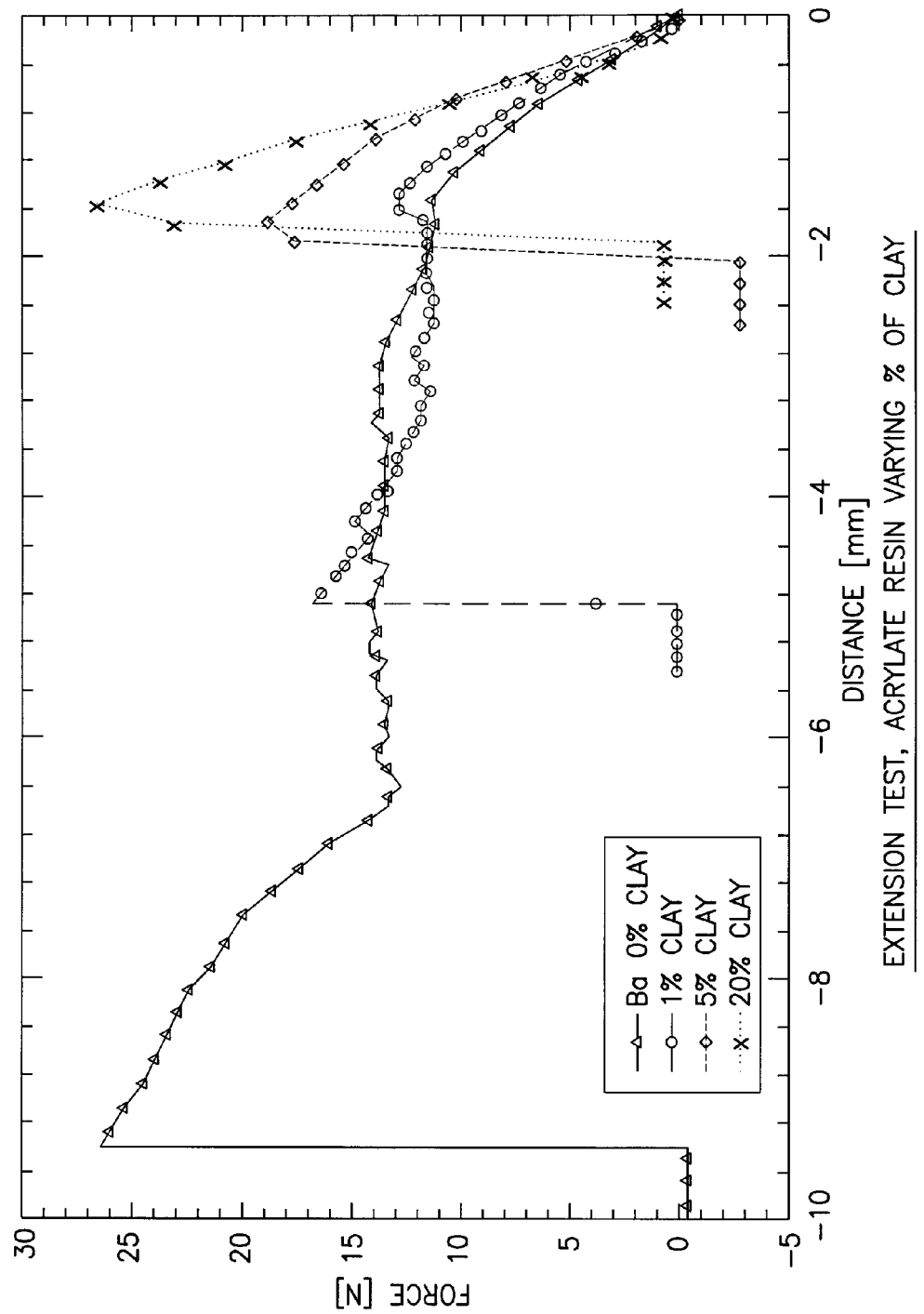
FIG. 4 shows the results of tensile tests on acrylate resin Ba with added clay, for the composition in Table 1.

FIG. 3 shows the effect of the two clays on the photo-polymerisation kinetics of acrylate blend Ad. Little or no change in the kinetics were seen. FIG. 4 shows the effect of clay 1 concentration on the tensile strength of resin blend Ba. The resin increases the breaking load but at high concentrations the breaking strain decreases sharply.

EXAMPLE 2

Divinyl Ether Type Resins

In this example, the compositions include component A, component B (cf. table 2) and C photoinitiator.
A. TEGDVE: tri(ethylene glycol) divinyl ether 98%
B.
   a. DEGDGE: di(ethylene glycol) diglycidyl ether
   b. GDGE: Glycerol diglycidyl ether
   c. NGDGE: Neopentyl glycol diglycidyl ether
   d. PPGDGE: Polypropylene glycol diglycidyl ether
   e. BDGE: 1,4-butanediol diglycidyl ether
C. Photoinitiator: triarylsulfonium hexafluorophosphate salts, mixed 50% in propylene carbonate. 5:10 drops

TABLE 2

Divinyl ether based resins formulations

| Formulation | Component A | Component B |
|---|---|---|
| B2a | TEGDVE | GDGE |
| B2b | | |
| B3a | TEGDVE | NGDGE |
| B3b | | |
| B4b | TEGDVE | PPGDGE |
| B5a | TEGDVE | BDGE |

Figure 5:
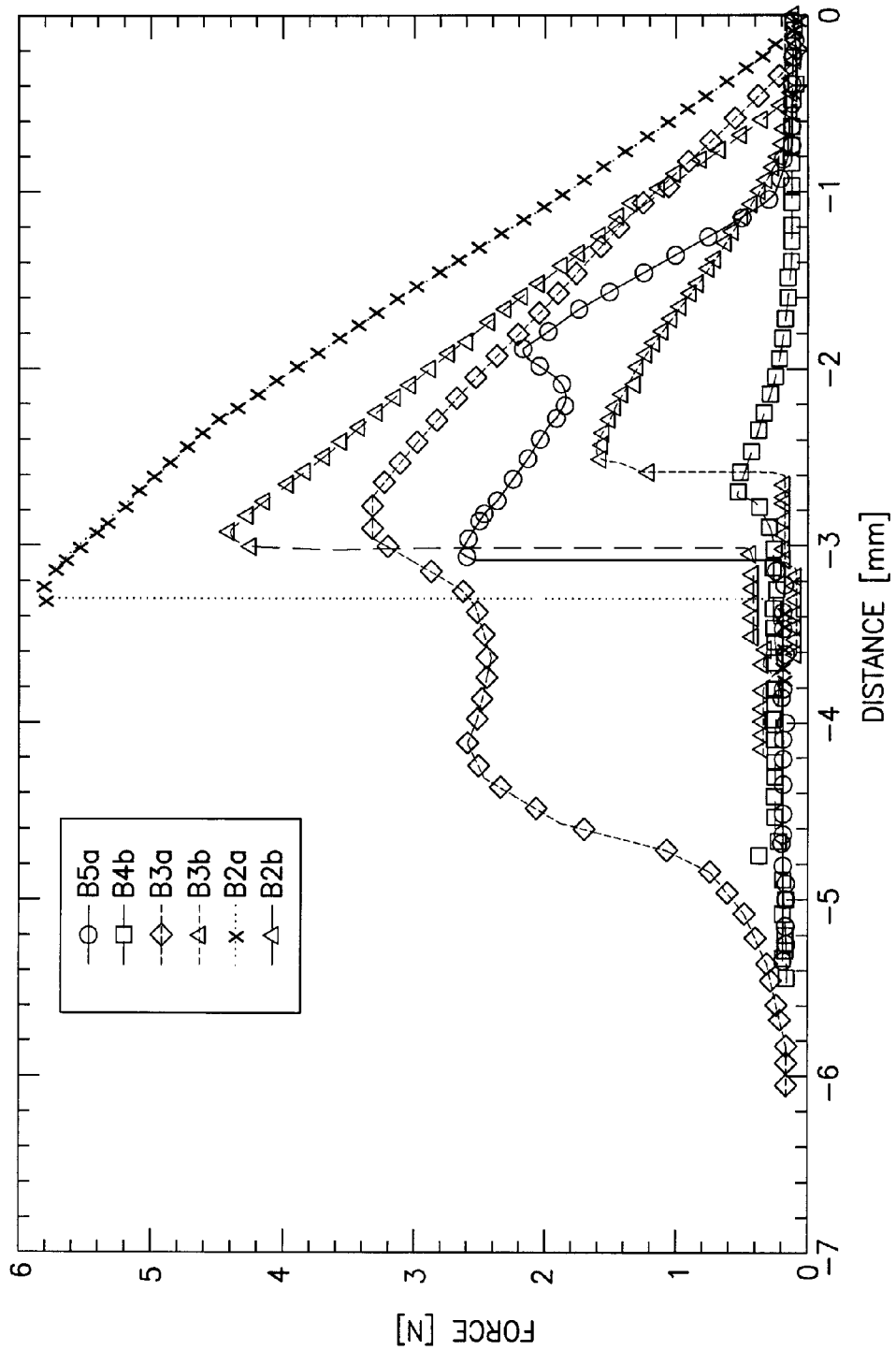
FIG. 5 shows the results of tensile tests on divinyl ether resins, for the compositions in Table 2.

These formulations produced resins that ranged quite widely in softness and elasticity. Resin B1 was too soft to test in tensile mode. FIG. 5 shows tensile tests on samples of the other formulations, some in duplicate (B2, B3.).

EXAMPLE 3

Vinyloxybutylbenzoate Type Resins

In this example the compositions include the photoinitiator C, component A and one of the components listed in B.

A. 4-vinyloxybutylbenzoate
B. di or trivinyl ether, such as:
   a. bis[4(vinyloxy)butyl]succinate
   b. bis[4(vinyloxy)butyl]isophtalate
   c. tris[4(vinyloxy)butyl]trimellitate
C. photoinitiator: triarylsulfonium hexafluorophosphate salts, mixed 50% in propylene carbonate (5-10 drops).

Figure 6:
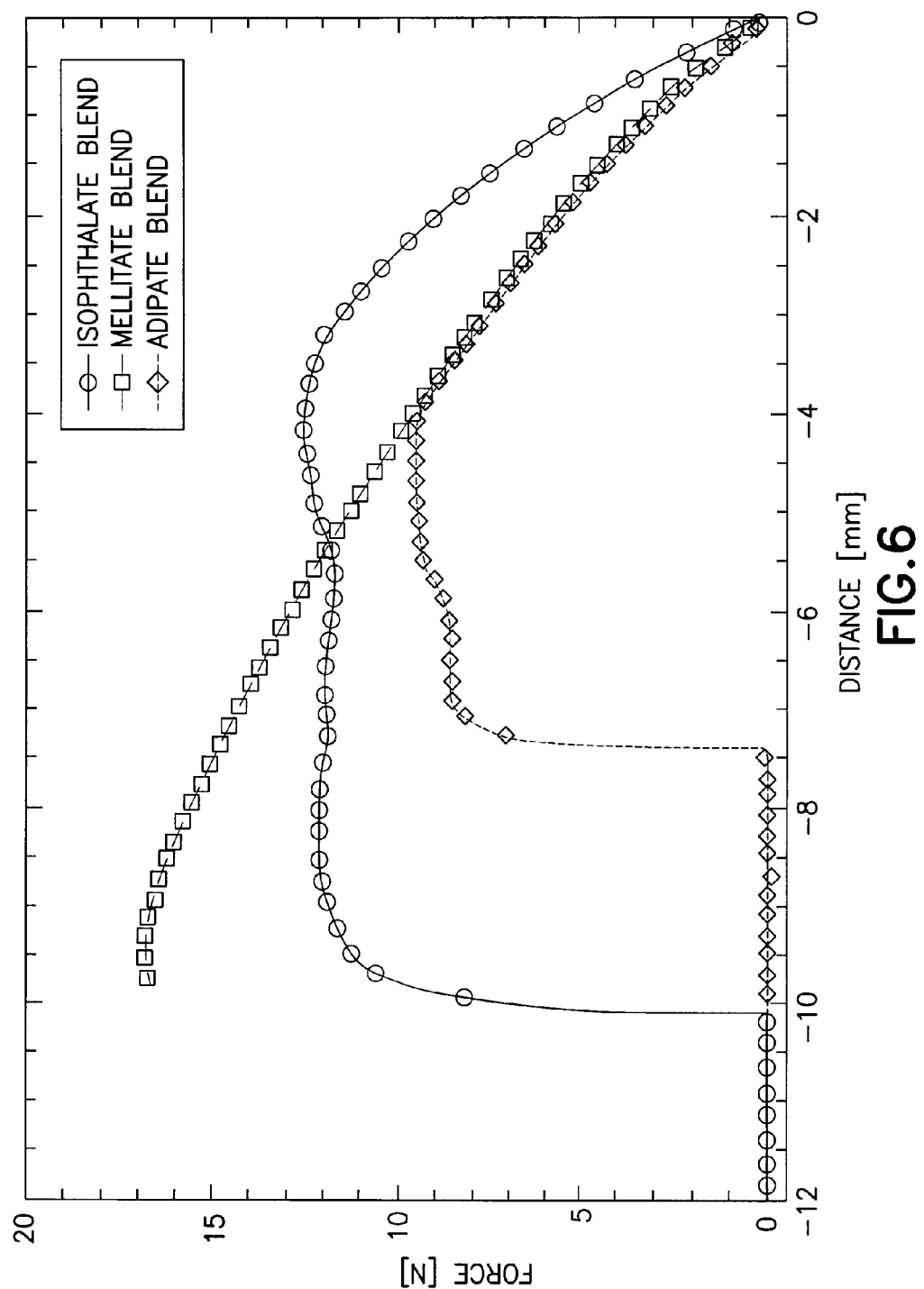
FIG. 6 shows the results of tensile strength tests on vinyloxybutylbenzoate type resins A:B ratio 2:1.

The component concentrations A and B were varied in ratio 2:1, 5:1, 10:1. Softer more elastic gels, with more rapid curing than acrylate type resins were obtained. FIG. 6 summarises test data for 2:1 ratios.

OTHER EXAMPLES

Other examples include Styrene-polybutadiene-styrene block copolymer dispersed in xylene at approximately 4 g/l, the reaction being initiated by 2-hydroxy-2-methyl-propiophenone or the triarylsulfonium hexafluorophosphate salts (50% in propylene carbonate). Both achieved a cure of a sticky gel, in 24 hours.

Conveyance Downhole To implement the present invention, the one or more components of the fluid composition can be delivered downhole according to various methods as follows.

The one or more components of the fluid composition can be delivered passively as part of the drilling fluid as soluble (solvated) components (either water or oil) to be crosslinked into a gel as they invade the formation or form part of the filtercake.

The one or more components of the fluid composition can be delivered as encapsulated chemicals to be passively captured in the filtercake, e.g. emulsified polymers, resins and/or polymers not soluble in the drilling fluid (water or oil).

Optionally, they can be concentrated at the treatment surface by some active mechanism. For example, resin particles filled with magnetic particles could be harvested from the circulating fluid by an electromagnet.

Although electrophoresis or dielectrophoreisis could be used, such methods are considered likely to be too slow for use in commercial wellbores.

In a preferred method, a tool 10 is provided, for example as shown in FIG. 7, which is configured to operate downhole. The tool 10 is configured to implement the present invention.

The tool 10 shown in FIG. 7(b) is attachable, e.g. by threaded portion 12, to a drill string, a bottom hole assembly (BHA) or a wire line, generally represented by the body 100 in FIG. 7(a).

The tool 10 may be attachable to a flow line for conveying one or more of the components of the fluid composition to the tool downhole, e.g. from outside the wellbore. The flow line may include a plurality of conduits for conveying respective components of the fluid composition.

The tool 10 may have an onboard reservoir for holding one or more of the components of the fluid composition to be delivered into the wellbore, e.g. to the wellbore wall. The reservoir may be in fluid communication with the flow line, or the reservoir may be self contained. The respective components of the fluid composition, or the fluid composition itself, in the reservoir may be concentrated to reduce the storage volume required of the reservoir.

The reservoir could be adapted to be refillable by dropping degradable balls of the fluid composition into the wellbore (or down a conduit which is in communication with the tool) to be captured by the tool, or to be captured by another assembly and conveyed to the reservoir.

The reservoir may be multi-chambered coil tubing (CT) with one or more chambers respectively filled with the components of the fluid composition (however, the one or more chambers may each be filled with a mixture of the one or more components of the fluid composition).

The tool 10 may include a main conduit which is reserved for the circulation of drilling mud. Bypass valves, or some other assembly, may be provided in the tool to direct the fluid composition to the surface which is to be coated.

A downhole curing tool. A tool according to the present invention may include one or more injectors 14 for directing the fluid composition (or one or more components thereof) to the surface which is to be coated. A plurality of injectors 14 may be in fluid communication with respective chambers (or flow line conduits), thereby allowing two or more of the components of the fluid composition to be mixed together in the wellbore after injection by the tool.

The or each injector 14 may be in fluid communication with the reservoir (or the flow line) such that the components of the fluid composition are mixed in the reservoir (or in an intermediate mixing chamber located upstream of the or each injector but downstream of the reservoir) prior to injection into the wellbore.

The tool 10 includes a source of actinic radiation, which preferable includes an emitter element 16 and a radiation generator. The generator may include a light emitting diode (LED). The generator preferably emits actinic radiation of a wavelength in the range of 250 nm to 800 nm.

Reaction Initiation. The actinic radiation for initiating the reaction is preferably delivered at an intensity of 0.1-1 mW/cm2.

Light sources such as halogen or mercury lamps which are fragile are not expected to be applicable in the downhole environment. However, an assembly including light guides, such as optical fibre waveguides, which can convey the actinic radiation from such light sources retained in a safe environment to the tool may be feasible.

Also, microwave and eximer lamps delivering high intensity radiation are available, and a source including such generators and a suitable waveguide is also feasible.

High powered laser light sources are available but are bulky, whilst compact lasers are relatively lower powered (mW). Therefore, it is preferred to use UV and/or blue/white LEDs which are now becoming widely available and are used in other industrial applications. LEDs are the preferred option for implementing the present invention.

The light source could be protected from the wellbore environment with an appropriate window, e.g of sapphire or diamond.

To minimize the attenuation path length between the emitter 16 and the surface to be coated, the emitter 16 may be included in a deployable movable member 18 which may be adapted to be pushed into contact with the surface to be coated.

A suitable deployment assembly already exists in the form of Schlumberger's Power-Drive technology—although for the present invention, steering the tool is not required and the contact force is envisaged to be significantly lower.

The portion of the tool which includes the emitter 16 may be a member movable relative to a main body of the tool. The movable member 18 is preferably deployable to irradiate a surface to be coated by the actinic radiation produced by the radiation generator. Additionally, wave guides and fibre optics could be used to transmit the light from the protected source to windows in the movable member 18.

The movable member 18 may also include one or more of the injectors 14. Therefore, the movable member 18 is preferably deployable both to deliver the fluid composition locally to the surface to be coated and to irradiate the fluid composition locally to the surface to be coated.

The or each injector 14 and the or each emitter 16 may be provided on respective movable members 18.

The components of the fluid composition may be mixed externally to the wellbore, and subsequently pumped downhole, e.g. to form a resin plug and squeezed into the formation to be plugged or coated whilst initiating the curing reaction downhole by photo-initiation.

The components for the radiation cured system could be carried in an emulsion (or multiple emulsion) and intimately mixed at the drill bit.

Another method for delivering the fluid composition may involve the components of the fluid composition being delivered by the main fluid flow, e.g. by the drilling mud, with the initiator being stored in a reservoir in the tool (or conveyed to the tool via the previously mentioned flow line) to be delivered into the wellbore by the tool.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

What is claimed:

1. A wellbore fluid comprising:
   a fluid; and
   a composition comprising:
      a pre-polymer, wherein the pre-polymer is selected from the group consisting of substituted $C_{2-5}$ alkenyl and substituted epoxidyl; and
      a photoinitiator, wherein the photoinitiator is selected from cation photoinitiator or free radical photoinitiator;
   wherein upon exposure to actinic radiation of a predetermined wavelength in the range of 100 nm to 1500 nm, the composition solidifies or gels to become impermeable to fluids.

2. The wellbore fluid of claim 1, wherein the substituted $C_{2-5}$ alkenyl is substituted $C_{2-5}$ alk-1-enyl.

3. The wellbore fluid of claim 1, wherein the $C_{2-5}$ alkenyl is substituted with one or more groups independently selected from —R, —OR, and —C(=O)OR, where R is selected from halo, hydroxyl, $C_{1-10}$ alkyl, $C_{1-10}$ aryl, and $C_{3-20}$ heterocyclyl.

4. The wellbore fluid of claim 1, wherein the $C_{2-5}$ alkenyl is substituted with a substituent comprising $C_{2-5}$ alkenyl, and the epoxidyl is substituted with a substituent comprising epoxidyl.

5. The wellbore fluid of claim 1, wherein the pre-polymer comprises a functional group selected from vinyl group and an epoxidyl group.

6. The wellbore fluid of claim 1, wherein the pre-polymer is a $C_{2-5}$ alk-1-enyl substituted with one or more groups independently selected from —R, —OR, and —C(=O)OR, where R is selected from halo, hydroxyl, $C_{1-10}$ alkyl, $C_{1-10}$ aryl, and $C_{3-20}$ heterocyclyl.

7. The wellbore fluid of claim 1, wherein the pre-polymer comprises a plurality of alkenyl groups.

8. The wellbore fluid of claim 1, wherein the pre-polymer comprises a plurality of epoxidyl groups.

9. The wellbore fluid of claim 1, wherein the free radical photoinitiator is selected from type I cleavable photoinitiators and type II hydrogen abstraction or electron transfer photoinitiators.

10. The wellbore fluid of claim 1, wherein the cation photoinitiator is a photoacid generator.

11. A composition comprising:
a filtercake; and
a solidifiable or gellable fluid, wherein the solidifiable or gellable fluid forms part of the filter cake, and wherein the solidifiable or gellable fluid comprises:
  a pre-polymer, wherein the pre-polymer is selected from the group consisting of substituted $C_{2-5}$ alkenyl and substituted epoxidyl; and
  a photoinitiator, wherein the photoinitiator is selected from cation photoinitiator or free radical photoinitiator;
wherein upon exposure to actinic radiation of a predetermined wavelength in the range of 100 nm to 1500 nm, the composition solidifies or gels to become impermeable to fluids.

12. The composition of claim 11, wherein the substituted $C_{2-5}$ alkenyl is substituted $C_{2-5}$ alk-1-enyl.

13. The composition of claim 11, wherein the $C_{2-5}$ alkenyl is substituted with one or more groups independently selected from —R, —OR, and —C(=O)OR, where R is selected from halo, hydroxyl, $C_{1-10}$ alkyl, $C_{1-10}$ aryl, and $C_{3-20}$ heterocyclyl.

14. The composition of claim 11, wherein the $C_{2-5}$ alkenyl is substituted with a substituent comprising $C_{2-5}$ alkenyl, and the epoxidyl is substituted with a substituent comprising epoxidyl.

15. The composition of claim 11, wherein the pre-polymer comprises a functional group selected from vinyl group and an epoxidyl group.

16. The composition of claim 11, wherein the pre-polymer is a $C_{2-5}$ alk-1-enyl substituted with one or more groups independently selected from —R, —OR, and —C(=O)OR, where R is selected from halo, hydroxyl, $C_{1-10}$ alkyl, $C_{1-10}$ aryl, and $C_{3-20}$ heterocyclyl.

17. The composition of claim 11, wherein the pre-polymer comprises a plurality of alkenyl groups.

18. The composition of claim 11, wherein the pre-polymer comprises a plurality of epoxidyl groups.

19. The composition of claim 11, wherein the free radical photoinitiator is selected from type I cleavable photoinitiators and type II hydrogen abstraction or electron transfer photoinitiators.

20. The composition of claim 11, wherein the cation photoinitiator is a photoacid generator.

* * * * *